United States Patent
Rumpsa et al.

(10) Patent No.: US 6,523,341 B1
(45) Date of Patent: Feb. 25, 2003

(54) COLD START VEHICLE CATALYST MONITOR

(75) Inventors: Todd Anthony Rumpsa, Berkley, MI (US); Paul Chester Gaworecki, Canton, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/479,172

(22) Filed: Jan. 7, 2000

(51) Int. Cl.⁷ .................................................. F01N 3/00
(52) U.S. Cl. ............................ 60/277; 60/274; 60/276; 60/284
(58) Field of Search .......................... 60/274, 276, 277, 60/284, 285

(56) References Cited

U.S. PATENT DOCUMENTS

| | | | |
|---|---|---|---|
| 5,267,472 A | | 12/1993 | Schneider et al. .......... 73/118.1 |
| 5,311,737 A | | 5/1994 | Komatsu et al. .............. 60/276 |
| 5,351,484 A | | 10/1994 | Wade .......................... 60/274 |
| 5,414,996 A | | 5/1995 | Sawada et al. ................ 60/274 |
| 5,419,122 A | | 5/1995 | Tabe et al. .................... 60/274 |
| 5,490,381 A | * | 2/1996 | Becker ......................... 60/274 |
| 5,531,069 A | | 7/1996 | Katsuhiko ..................... 60/276 |
| 5,544,481 A | | 8/1996 | Davey et al. .................. 60/274 |
| 5,591,905 A | | 1/1997 | Fujimoto et al. .......... 73/118.1 |
| 5,655,363 A | | 8/1997 | Ito et al. ....................... 60/276 |
| 5,675,967 A | | 10/1997 | Ries-Mueller ................ 60/274 |
| 5,684,248 A | | 11/1997 | Iwata ......................... 73/118.1 |
| 5,715,676 A | * | 2/1998 | Schnaibel et al. ............ 60/274 |
| 5,727,383 A | * | 3/1998 | Yamashita et al. ............ 60/276 |
| 5,743,082 A | * | 4/1998 | Matsumoto et al. .......... 60/274 |
| 5,743,086 A | * | 4/1998 | Nagai ........................... 60/276 |
| 5,815,828 A | * | 9/1998 | Nankee, II et al. ......... 701/109 |
| 5,822,979 A | * | 10/1998 | Hamburg et al. ............. 60/274 |
| 5,848,527 A | * | 12/1998 | Mitsutani ..................... 60/274 |
| 5,899,062 A | * | 5/1999 | Jerger et al. .................. 60/274 |
| 6,073,440 A | * | 6/2000 | Douta et al. .................. 60/277 |

* cited by examiner

*Primary Examiner*—Thomas Denion
*Assistant Examiner*—Binh Tran
(74) *Attorney, Agent, or Firm*—Allan J. Lippa; John D. Russell

(57) ABSTRACT

Method and apparatus for monitoring a catalytic converter (32) during engine (catalyst) warm-up by first and second heated exhaust gas oxygen sensors (60, 70) located upstream and downstream, respectively, of the catalytic converter. A microprocessor determines a change of signal output of the downstream sensor relative to signal output of the upstream sensor during engine (catalyst) warm-up initiated by engine cold starting during the catalyst warm-up period. A catalyst light-off temperature is determined by the microprocessor when the change occurs. The catalyst light-off temperature thus determined is compared to a stored reference catalyst light-off temperature that is indicative of a properly functioning (e.g. fresh) catalyst to assess the extent or degree of degradation of the catalyst.

12 Claims, 3 Drawing Sheets

COLD START VEHICLE CATALYST MONITOR

BACKGROUND OF THE INVENTION

1. Field of the Invention

The present invention relates to monitoring of a vehicle catalytic converter during vehicle engine/exhaust warm-up to assess condition of the catalytic converter.

2. Description of Related Art

Modern automotive engines typically use a catalytic converter to reduce the exhaust gas emissions produced by the engine. Such converters operate to chemically alter the exhaust gas composition to help meet various environmental regulations governing tailpipe emissions. Several methods have been developed to monitor operability of the catalytic converter under steady state engine operating conditions. One method described in U.S. Pat. No. 5,544,481 uses a microprocessor to determine a ratio of signal output amplitudes of upstream and downstream exhaust gas oxygen sensors during steady state engine operation.

An object of the present invention is to provide method and apparatus for monitoring a catalytic converter during engine/exhaust warm-up (i.e. during non-steady state catalyst operation) in a manner to assess the current condition of the catalyst.

SUMMARY OF THE INVENTION

The present invention provides a method of monitoring a catalytic converter during engine warm-up (non-steady state catalyst operation) using signal outputs of first and second exhaust gas oxygen sensors located upstream and downstream, respectively, of the catalytic converter. In one embodiment, a change in the signal output (e.g. switching characteristics) of the downstream sensor relative to the signal output of upstream sensor during engine warm-up is used to estimate the catalyst light-off temperature. In an illustrative embodiment of the present invention, a length ratio of signal output amplitudes of the first and second exhaust gas oxygen sensors is determined by an engine microprocessor during engine (and catalyst) warm-up initiated by engine cold starting. The microprocessor determines a catalyst light-off temperature when a transition of the ratio occurs from a relatively high value (e.g. near 1) indicative of low catalyst oxygen storage to a relatively lower value (e.g. near 0) indicative of relatively high catalyst oxygen storage. The catalyst light-off temperature thus determined is compared to a stored reference catalyst light-off temperature that is indicative of a properly functioning (e.g. fresh) catalyst to assess the condition of the catalyst; e.g. the extent or degree of any catalyst degradation.

The above objects and advantages of the present invention will become more readily apparent from the following description taken with the following drawings.

DETAILED DESCRIPTION OF THE PREFERRED EMBODIMENT

Figure 1:
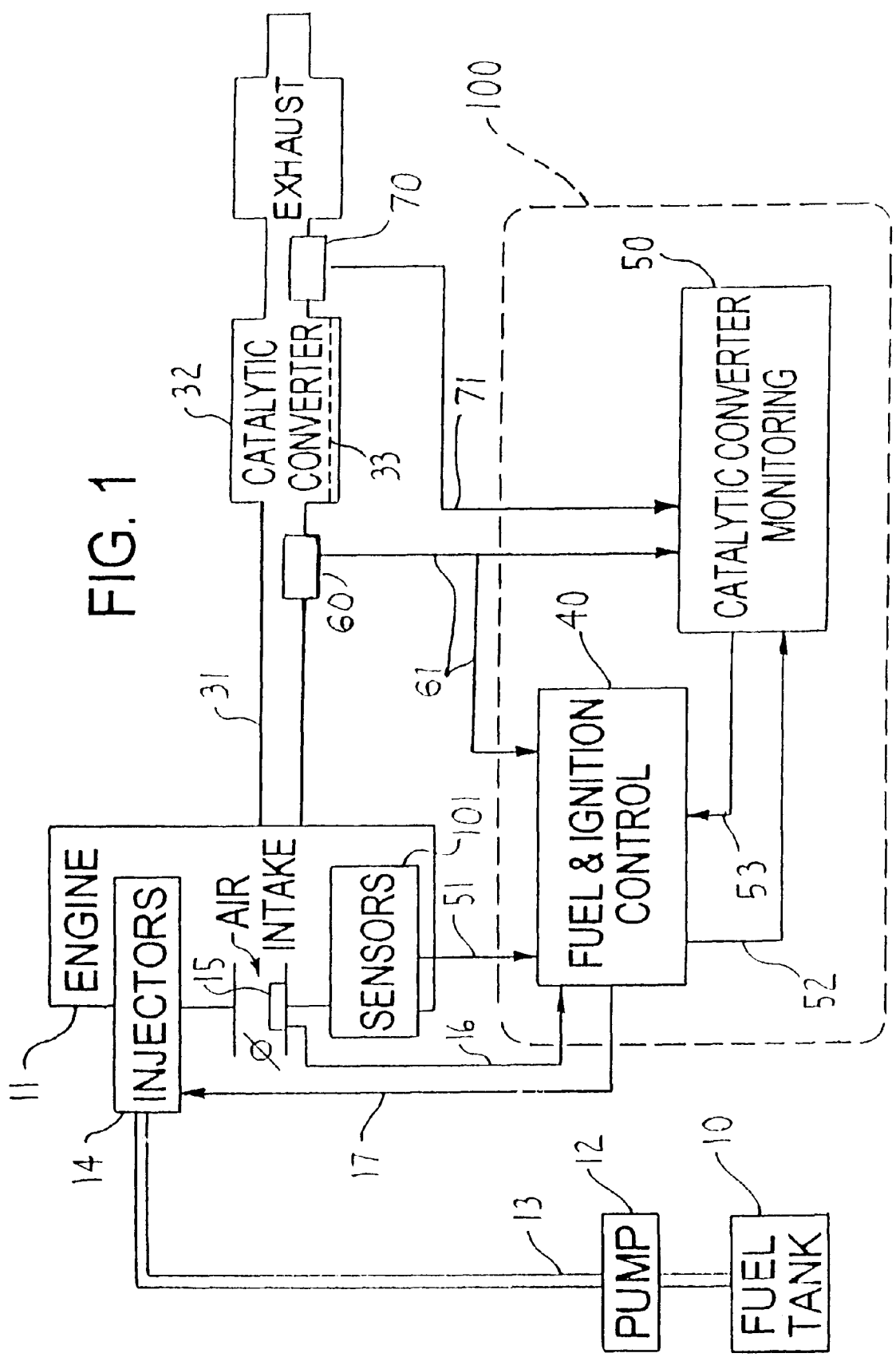
FIG. 1 is a schematic diagram of an internal combustion engine and an electronic engine microprocessor control for practicing an embodiment of the present invention.

FIG. 1 illustrates a motor vehicle system having fuel pump 12 that pumps fuel from a fuel tank 10 through a fuel line 13 to a set of fuel injectors 14 which inject fuel into an internal combustion engine 11 in conventional manner. The fuel tank 10 may contain gasoline, methanol, or a combination of liquid fuels.

The catalyst 33 in catalytic converter 32 chemically converts exhaust gas to reduce emissions once catalyst operating temperature (light-off temperature) is reached. The catalyst operating or "light-off" temperature is an elevated temperature (i.e. a steady-state catalyst operating temperature) where the catalyst 33 begins to chemically convert exhaust gas to reduce emissions. Although only one catalytic converter 32 is shown in FIG. 1, a catalytic converter 32 is connected to the exhaust manifold of each cylinder bank of the engine 11 as described, for example, in U.S. Pat. No. 5,544,481, the teachings of which are incorporated herein by reference, and is monitored in the manner described below for catalytic converter 32.

A heated exhaust gas oxygen (HEGO) sensor 60 is positioned on the exhaust system 31 of the engine 11 upstream of the catalytic converter 32 and detects the oxygen content of the exhaust gas generated by the engine 11. The sensor 60 transmits a representative signal 61 to an electronic engine controller (EEC) 100 and to catalytic converter monitoring module 50 described below. A second heated exhaust gas oxygen (HEGO) sensor 70 is positioned on the exhaust system 31 of the engine 11 downstream of the catalytic converter 32 and detects the oxygen content of the exhaust gas discharged from the catalytic converter 32. The sensor 70 transmits a representative signal 71 to catalytic converter monitoring module 50 described below. Still other sensors indicated generally at 101 provide additional information about engine performance to the EEC 100. For example, the other sensors 101 provide signals representative of crankshaft position, angular velocity, throttle position, mass air flow, etc. that are processed by the EEC 100 to control engine operation.

EEC 100 typically comprises one or more microprocessors each comprised of one or more integrated circuits providing a microprocessor, read only memory (ROM) which stores the programs executed by the microprocessor and configurations data, peripheral data handling circuits, and a random access memory read/write memory for storing dynamically changing data. These microprocessors typically include built-in analog-to-digital conversion capabilities used for translating analog signals from the sensors and the like to digitally expressed values as well as timer/counters for processing data.

The fuel and ignition control module 40 contained within EEC 100 receives the HEGO signal 61 indicative of the amount of oxygen in the engine exhaust gas, an air flow signal 16 from conventional mass air flow detector 15, and a variety of other signals 51 and calculates the amount of fuel to be delivered to the fuel injectors 14 and provides signal 17 to injectors 14. The module 40 also controls ignition timing of the air/fuel mixture combusted in each cylinder of the engine 11.

The catalytic converter monitoring module 50 is enabled during engine warm-up (non-steady state catalyst operation)

initiated by engine cold starting to inform the module 40 as to the operability of the converter 32 pursuant to the present invention in a manner described below. The module 50 operates under control of the module 40 via a plurality of control signals 52, 53.

Upstream HEGO sensor 60 and a downstream HEGO sensor 70 transmit analog voltage signals 61 and 71, respectively, to the module 50. In practice of the invention, the sensors 60, 70 detect the oxygen content of the exhaust gas upstream and downstream of the converter 32 during the engine (and catalyst) warm-up period initiated by engine cold-starting and transmit analog signals 61 and 71, respectively, representative of such oxygen content to the module 50. That is, upstream sensor 60 is positioned to detect oxygen content of the engine exhaust gas flowing into the converter 32 prior to catalyst "light-off", 40 while downstream sensor 70 is positioned to detect oxygen content of the exhaust gas flowing out of the converter 32.

In accordance with an embodiment of the present invention, catalytic converter 32 is monitored by catalytic converter module 50 which is enabled by fuel and ignition module 40 during engine (and catalyst) warm-up initiated by engine cold-starting. The module 50 monitors catalytic converter 32 using signals 61, 71 generated by the HEGO sensors 60, 70 associated with converter 32. The sensor 60 is sometimes referred to as the control sensor, while the sensor 70 is sometimes referred to as the CMS sensor (catalyst monitor sensor).

Figure 2:
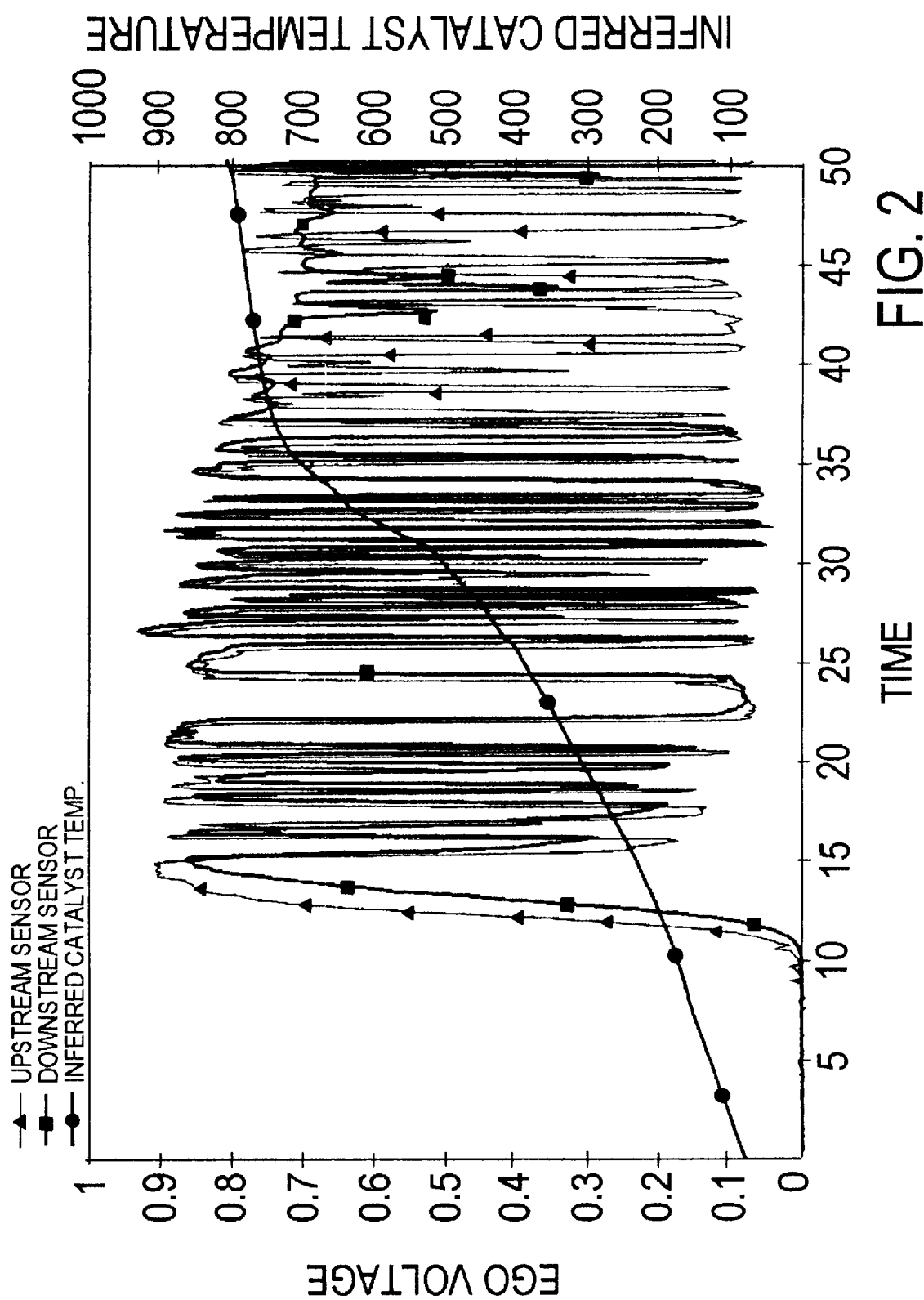
FIG. 2 is a graph illustrating signal voltage outputs of heated exhaust gas oxygen sensors versus time (seconds) located upstream and downstream of the catalytic converter and inferred catalyst temperature during engine warm-up initiated by engine cold starting.

For example, FIG. 2 illustrates typical voltage output signals 61, 71 generated by the sensors 60, 70, respectively, over a period of time of engine (and catalyst) warm-up initiated by engine cold starting for catalytic converter 32. FIG. 2 shows engine and thus catalyst warm-up over a period of about 50 seconds.

During the overall period of engine warm-up, there is observed an initial period where the output voltage amplitudes of both HEGO sensors 60, 70 exhibit high switching activity from the standpoint that the output voltage amplitudes of signals 61, 71, vary widely with the voltage amplitude changing sign (changing from a positive slope to a negative slope and vice versa) as illustrated in FIG. 2.

From the signal output amplitudes of the sensors 60, 70 associated with catalytic converter 32, the microprocessor of EEC 100 in one routine calculates a signal length ratio during engine (and catalyst) warm-up initiated by engine cold starting for catalyst 33. The length ratio is calculated by determining the inflection points (transition of calculated slope sign reversal) of each signal from each sensor 60, 70 and subtracting the maximum and minimum voltage output amplitude values at the inflection points for each sensor 60, 70 to determine the absolute voltage difference between maximum and minimum signal values for each sensor 60, 70 during each background loop of the routine. The downstream HEGO sensor absolute voltage difference is divided by the upstream HEGO sensor absolute voltage difference to determine the length ratio. The length ratio is calculated with respect to the inferred catalyst temperature for tracking of the inferred light-off temperature. The calculated slope sign reversal of each signal from sensor 60, 70 is obtained pursuant, to the teachings of U.S. Pat. No. 5,544,481, which are incorporated herein by reference.

The microprocessor of EEC 100 in another routine also determines for catalytic converter 32 an inferred catalyst temperature during the same engine (and catalyst) warm-up period shown, for example, in FIG. 2 as a curve designated Inferred Catalyst Temp.". The inferred catalyst temperature is determined concurrently with the above length ratio for catalytic converter 32 during the engine (and catalyst) warm-up using a catalyst temperature model stored in microprocessor memory. The stored catalyst temperature model can be determined empirically from engine test stand data and stored in microprocessor memory in the form of lookup tables for the engine operating variables (air, spark, fuel, etc.) and equations to calculate the interactive effects of the engine operating variables. The inferred catalyst temperature determined by the microprocessor is used for monitoring both converters 32.

A catalyst light-off temperature is calculated by the microprocessor of EEC 100 for catalytic converter 32 and corresponds to an inferred catalyst temperature determined by the microprocessor when a transition of the length ratio occurs from a relatively high ratio value indicative of low catalyst oxygen storage and to another relatively lower ratio value indicative of relatively high catalyst oxygen storage; for example, when the length ratio transitions from a length ratio near a value of 1 indicative that the catalyst 33 has no or little oxygen storage to a value near or approaching 0 indicative that the catalyst 33 has relatively high oxygen storage and is converting engine exhaust emissions efficiently. The transition point is taken when the length ratio decreases to a preselected lower threshold length ratio value, such as a value of 0.2 threshold value shown in FIG. 3 for purposes of illustration only.

Figure 3:
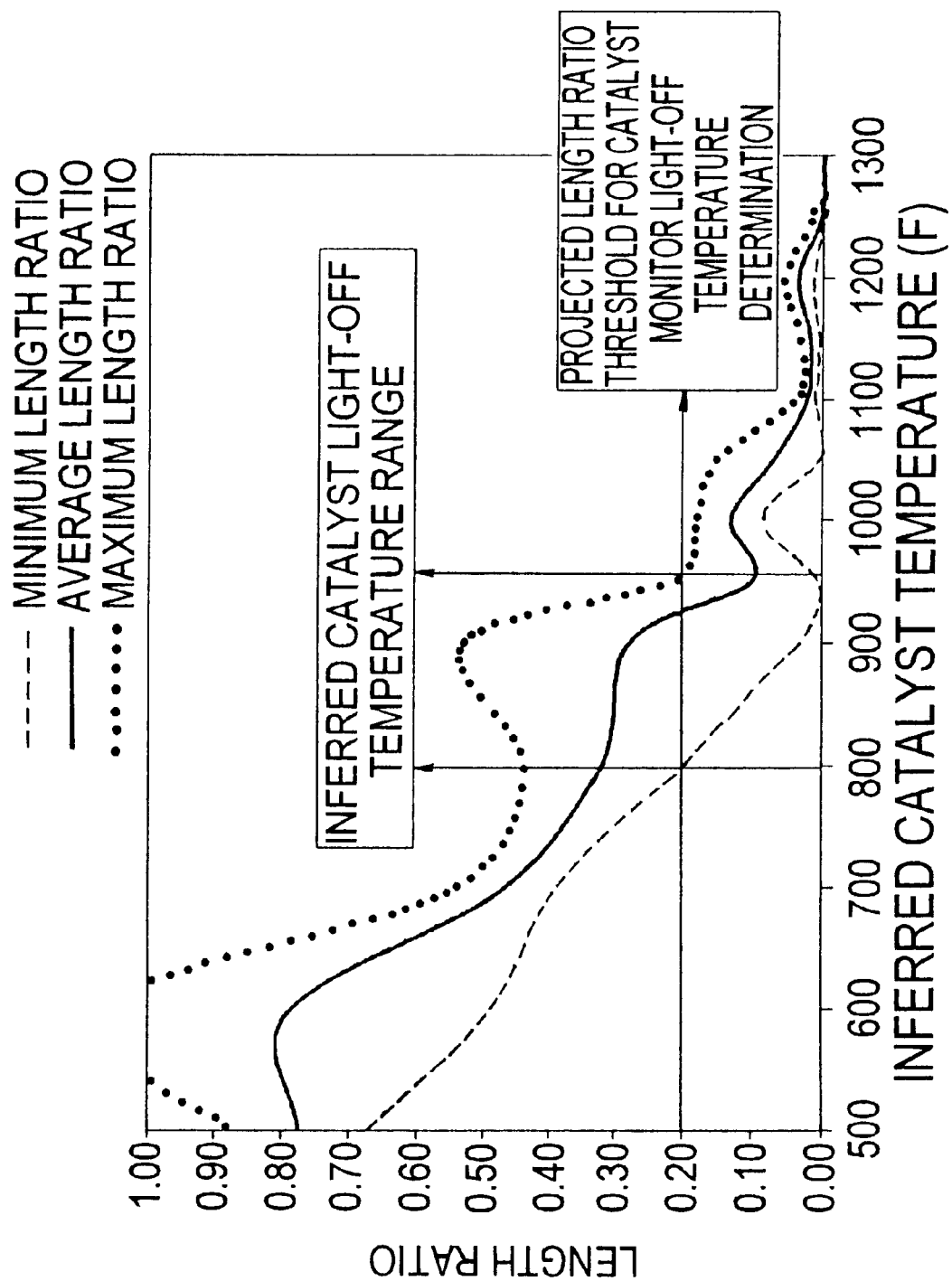
FIG. 3 is a graph of a typical signal length ratio versus inferred catalyst temperature of the upstream and downstream heated exhaust gas oxygen sensors for an exemplary cylinder bank of a six cylinder automotive internal combustion engine. Typical minimum and maximum signal length ratios versus inferred catalyst temperature are also shown.

Referring to FIG. 3, a typical graph (see solid line curve) of the length ratio versus inferred catalyst temperature for catalytic converter 32 of each cylinder bank of a six cylinder automotive engine is shown for purposes of illustrating the transition of the length ratio during a typical engine (catalyst) warm-up period on an engine test stand. Also shown in FIG. 3 are curves for typical a minimum length ratio versus inferred catalyst temperature and a maximum length ratio versus inferred catalyst temperature. Since each cylinder bank of the six cylinder engine is communicated to a separate catalytic converter 32, each cylinder bank would generate a representative length ratio versus inferred catalyst temperature curve as illustrated in FIG. 3. The catalyst light-off temperature for each catalytic converter 32 is calculated by the EEC microprocessor when the length ratio transitions to the predetermined lower threshold length ratio value, such as a ratio value of 0.2 shown in FIG. 3 for purposes of illustration only.

In an actual engine application, data signals representative of a single value of length ratio versus inferred catalyst temperature would be generated and processed pursuant to the invention to provide a calculated light-off temperature for each catalytic converter 32 during the engine (catalyst) warm-up period initiated by engine cold starting.

The catalyst light-off temperatures calculated by the EEC microprocessor at the transition of the length ratio from a value near 1 to a value approaching 0 then is compared by the EEC microprocessor to a stored reference catalyst light-off temperature that is indicative of a properly functioning (e.g. fresh) catalyst to assess the extent or degree of degradation of the catalyst. The stored reference catalyst light-off temperature indicative of a properly functioning (e.g. fresh) catalyst is determined empirically from engine test stand data and is stored in EEC microprocessor memory as a table of values of catalyst temperature.

Comparison of the calculated catalyst light-off temperature versus the reference catalyst light-off temperature provides a means to assess the extent or degree of degradation of the catalyst 33. For example, values of the calculated catalyst light-off temperature can be stored in the microprocessor memory of EEC 100 in cumulative manner so that the microprocessor can monitor the condition of the catalyst 33 over time. When the microprocessor senses that the catalytic converter 32 has failed or degraded to an extent that excessive emissions would be produced, the EEC 100 commands that a signal be displayed on the vehicle dashboard or otherwise to alert the vehicle operator that the catalytic converter 32 requires service.

While the invention has been described in terms of specific embodiments thereof, it is not intended to be limited thereto but rather only as set forth in the appended claims.

What is claimed is:

1. A method of monitoring a catalytic converter during engine warm-up, comprising:

determining a change of signal output of an exhaust gas oxygen sensor located downstream of the catalytic converter relative to signal output of an exhaust gas oxygen sensor located upstream of the catalytic converter during catalyst warm-up initiated by engine cold-starting, determining a relation of catalyst temperature versus time during said catalyst warm-up, and determining a catalyst light-off temperature by determining a catalyst temperature from said relation when said change occurs.

2. The method of claim 1 including the further step of comparing said catalyst light-off temperature to a reference catalyst light-off temperature to assess condition of the catalyst.

3. The method of claim 1 wherein said change of signal output corresponds to a change of a ratio determined by dividing a signal output amplitude of said downstream sensor by a signal output amplitude of said upstream sensor.

4. The method of claim 3 wherein said ratio transitions from a relatively high value indicative of low catalyst oxygen storage and to a relatively low value indicative of relatively high catalyst oxygen storage.

5. The method of claim 1 wherein values of said catalyst light-off temperature are stored and monitored over time to assess condition of said catalyst over time.

6. The method of claim 1 including inferring a catalyst temperature during said catalyst warm-up and determining said catalyst light-off temperature as the inferred catalyst temperature when said change occurs.

7. Apparatus for monitoring a catalytic converter during engine warm-up of a motor vehicle, comprising:

first and second exhaust gas oxygen sensors located upstream and downstream, respectively, of the catalytic converter, and microprocessing means for determining a change of signal output of said second exhaust gas oxygen sensor relative to signal output of said first exhaust gas oxygen sensor during catalyst warm-up initiated by engine cold starting, said microprocessing means determining a relation of catalyst temperature versus time during said catalyst warm-up and determining a catalyst light-off temperature by determining said catalyst temperature from said relation when said change occurs.

8. The apparatus of claim 7 wherein microprocessing means compares said catalyst light-off temperature to a stored reference catalyst light-off temperature to assess condition of the catalyst.

9. The apparatus of claim 7 wherein said microprocessing means determines said change of a ratio determined by dividing a signal output amplitude of said downstream sensor by a signal output amplitude of said upstream sensor.

10. The apparatus of claim 9 wherein said microprocessing means detects a transition of said ratio from a relatively high value indicative of low catalyst oxygen storage and to a relatively low value indicative of relatively high catalyst oxygen storage.

11. The apparatus of claim 7 wherein said microprocessing means stores said catalyst light-off temperature values and monitors said values over time to assess condition of said catalyst over time.

12. The apparatus of claim 7 wherein said microprocessing means infers a catalyst temperature during said catalyst warm-up and determines said catalyst light-off temperature as the inferred catalyst temperature when said change occurs.

\* \* \* \* \*